(12) United States Patent
Dagman et al.

(10) Patent No.: US 8,376,853 B2
(45) Date of Patent: Feb. 19, 2013

(54) HAND HELD SELF-ORIENTATING TARGETING GAME

(75) Inventors: Vadim Dagman, Foster City, CA (US); Sandra Shmunis, Hillsborough, CA (US)

(73) Assignee: AppTurn, Inc., Burlingame, CA (US)

( * ) Notice: Subject to any disclaimer, the term of this patent is extended or adjusted under 35 U.S.C. 154(b) by 123 days.

(21) Appl. No.: 12/807,307

(22) Filed: Sep. 1, 2010

(65) Prior Publication Data

US 2011/0092289 A1 Apr. 21, 2011

Related U.S. Application Data

(60) Provisional application No. 61/275,858, filed on Sep. 2, 2009.

(51) Int. Cl.
*A63F 9/24* (2006.01)

(52) U.S. Cl. ............... 463/37; 463/16; 463/33; 463/43

(58) Field of Classification Search ............. 463/16, 463/33, 37, 43
See application file for complete search history.

(56) References Cited

U.S. PATENT DOCUMENTS

| | | | | |
|---|---|---|---|---|
| 7,918,728 | B2 * | 4/2011 | Nguyen et al. | 463/29 |
| 7,953,246 | B1 * | 5/2011 | Tu et al. | 382/103 |
| 2008/0268931 | A1 * | 10/2008 | Alderucci et al. | 463/11 |
| 2008/0268956 | A1 * | 10/2008 | Suzuki | 463/37 |
| 2011/0009195 | A1 * | 1/2011 | Porwal | 463/37 |

\* cited by examiner

*Primary Examiner* — Pierre Eddy Elisca
*Assistant Examiner* — Shahid Kamal
(74) *Attorney, Agent, or Firm* — Stolowitz Ford Cowger LLP

(57) ABSTRACT

A self-orientating hand held game unit includes a display screen, a game piece illustrated on the screen, and a touch sensitive system to detect the movement of a finger across the screen and operate the game piece to launch a projectile toward a target on the screen.

17 Claims, 4 Drawing Sheets

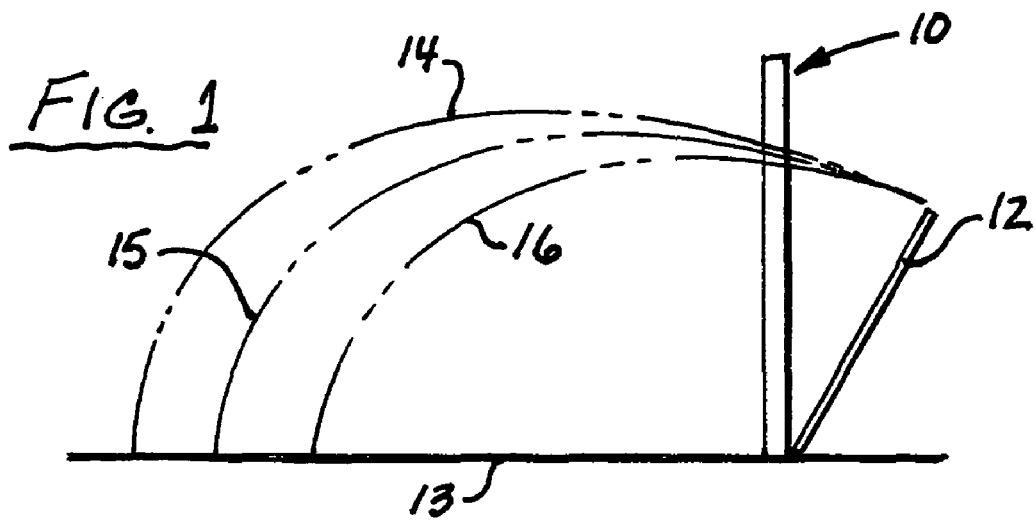
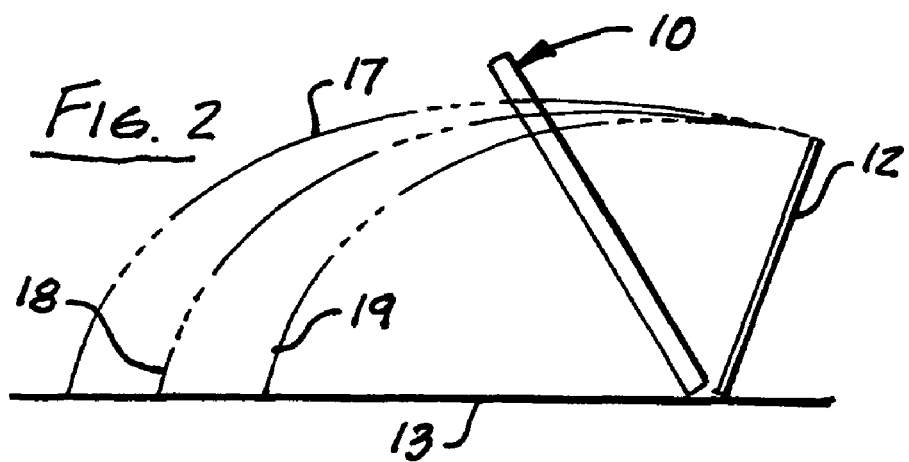
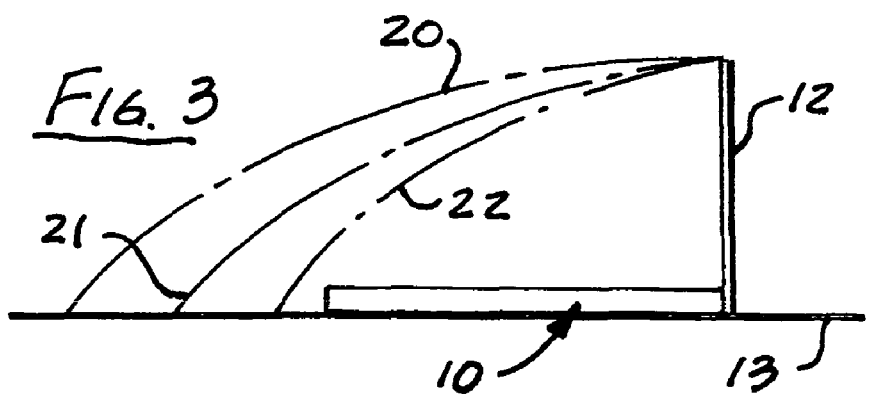

HAND HELD SELF-ORIENTATING TARGETING GAME

This application claims priority based on provisional application Ser. No. 61/275,858, filed Sep. 2, 2009.

This invention pertains to games.

More particularly, the invention pertains to computer games.

In a further respect, the invention pertains to a hand held game unit which includes a display screen and which determines the orientation of the game unit to adjust the orientation of a game piece which appears on the display screen.

A variety of computer games have long been available. The development of new computer games which facilitate the development of hand-eye coordination and which provide entertainment has long been desired.

Accordingly, it is the objective of the invention to provide a new computer game.

This, and other, further and more specific objects and advantages of the invention will be apparent to those skilled in the art from the following detailed description thereof, taken in conjunction with the drawings, in which:

FIG. 1 is a schematic diagram illustrating the mode of operation of the game of the invention;

FIG. 2 is a schematic diagram further illustrating the mode of operation of the game of the invention;

FIG. 3 is a schematic diagram further illustrating the mode of operation of the game of the invention;

Briefly, in accordance with the invention, provided is an improved game. The game comprises a handheld unit including a display screen; a touch sensitive system to detect and generate first signals representing a finger touching the screen, moving across the screen, and lifting off the screen; an orientation detection system to detect and generate second signals representing the spatial orientation and movement of the hand held unit; at least one target depicted on the screen; a sling shot depicted on the screen, the sling shot including a frame, an extendable sling, and a projectile releasable from the sling; and, a microprocessor to receive said second signals and adjust the orientation of said sling shot on said screen when said spatial orientation of said handheld unit is adjusted, and to receive the first signals and distend the sling when a finger is placed on the screen on the sling and is slid over the screen, and release the sling and to propel the projectile from the sling toward the target when the finger is lifted from the screen.

Figure 4:
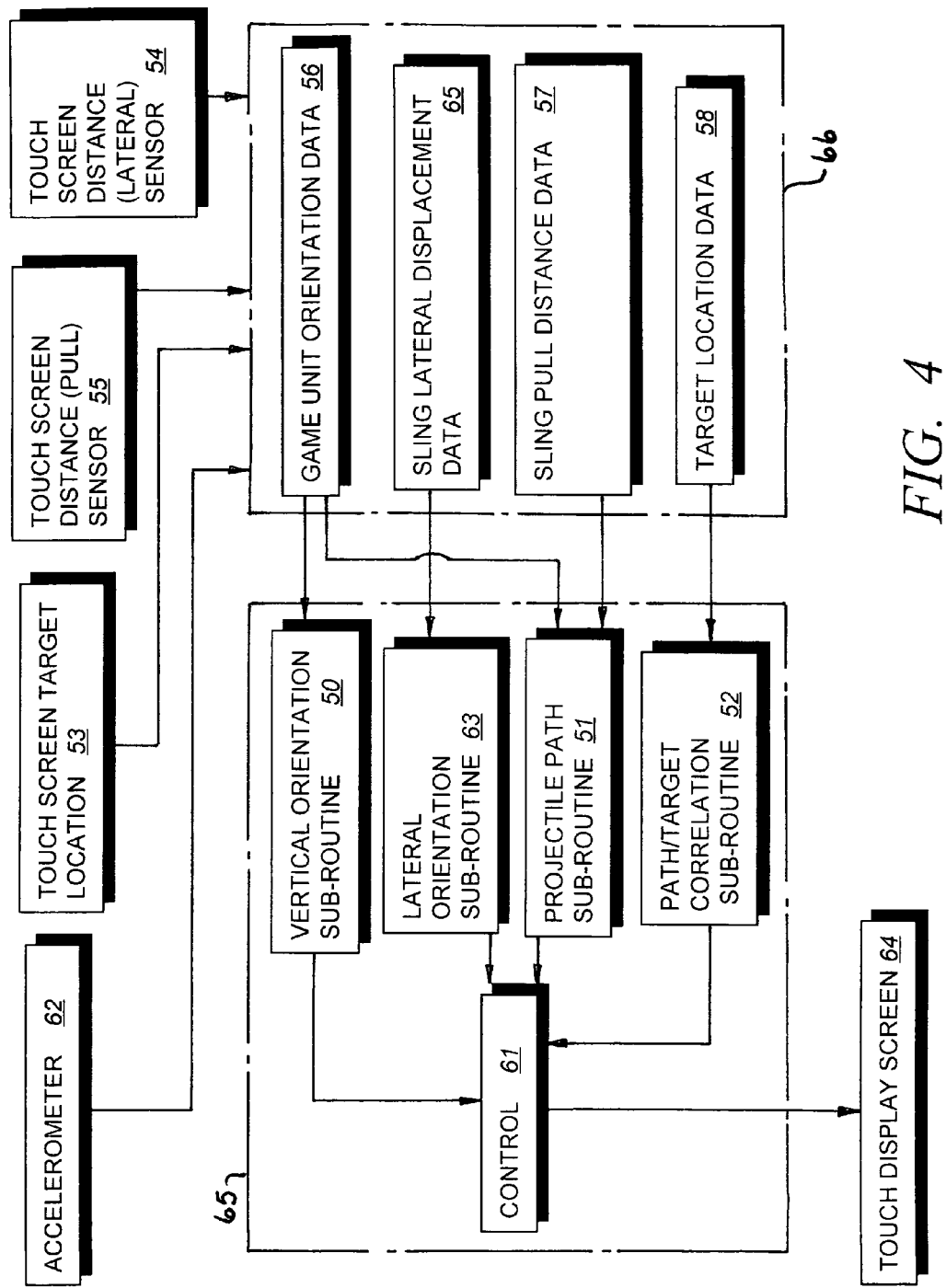
FIG. 4 is a block diagram illustrating the game unit of the invention.

Turning now to the drawings, which depict the presently preferred embodiments of the invention for purposes of illustration and not limitation, and in which like reference characters refer to corresponding elements throughout the several views, the game unit 10 (FIGS. 1 to 3) includes a display screen 64 (FIGS. 4, 6), and the various components further illustrated in FIG. 4. The microprocessor illustrated in FIG. 4 includes a controller 65 and memory 66. Data input into memory 66 (and controller 65) includes data from accelerometer 62, touch screen target location 53, touch screen distance (pull) sensor 55, and, touch screen distance (lateral) sensor 54.

Controller 65 includes control 61, vertical orientation sub-routine 50, lateral orientation sub-routine 63, projectile path sub-routine 51, and path/target correlation sub-routine 52. Controller 65 can includes any. other desired sub-routines. Memory 66 includes game unit orientation data 56, sling lateral displacement data 65, sling pull distance data 57, and target location data. Memory 66 can includes any other desired data.

The function of the accelerometer, or any other desired system used in place of the accelerometer, is to determine the orientation of the hand held game unit 10 with respect to a vertical axis which is normal to the ground and to transmit such orientation to memory 66 as game unit orientation data 56. In FIG. 1, unit 10 is parallel to said vertical axis. In FIG. 2, unit 10 is at an angle of about thirty degrees with respect to the vertical axis. In FIG. 3, unit 10 is perpendicular to the vertical axis. The orientation of the game unit 10 is important because it is used to orient the sling shot 12 which appears on the display screen 64 (FIGS. 1 to 3, 6). When, as shown in FIG. 1, the game unit 10 is vertically oriented, the sling shot 12 appears on display screen 64 and is canted and "aimed" upwardly in the manner shown in FIG. 1. When, as shown in FIG. 2, the game unit 10 is tilted away from the vertical axis, the sling shot 12 appears on display screen 64 and is canted and "aimed" upwardly, but not to the degree shown in FIG. 1. When, as shown in FIG. 3, the game unit 10 is parallel to the ground the sling shot 12 appears on display screen 64 as being perpendicular to the ground, in the manner illustrated in FIG. 6.

When a potential target 25 appears on display screen 64, data indicating the location of target 25 is input from touch screen target location 53 into memory 66 as target location data 58.

When a user initially contacts display screen 64 by placing a finger on display screen 64 on projectile holder or "pouch" portion 27 of the sling, then "drags" his finger over screen 64 in the direction of arrow A to stretch and "pull" the sling (which stretching is preferably depicted on screen 64), and then "releases" the sling by removing his finger from contact with screen 64, the distance that the user's finger slid over the screen from the initial screen contact to the release point is determined by a touch screen distance (pull) sensor 55 which transmits to memory 66 sling pull distance data 57 representing this distance.

When a user initially places a finger on display screen 64 on projectile holder 27 of the sling, laterally "drags" his finger over screen 64 in the direction of arrow B or C to move the sling to the left or right (which movement is preferably depicted on screen 64), and then "releases" the sling by removing his finger from contact with screen 64, the distance that the user's finger slid over the screen from the initial screen contact to the release point is determined by a touch screen distance (pull) sensor 55 which transmits to memory 66 sling lateral displacement data 65 representing this distance.

Vertical orientation sub-routine 50 utilizes game unit orientation data 56 to determine the orientation of game unit 10 and the corresponding orientation of sling shot 12 on screen 64 and to generate signals to control 61 representing the corresponding orientation of sling shot 12 which should appear on screen 64. Control 61 transmits control signals to display screen 64 to cause the orientation of sling shot 12 to be properly represented on screen 64.

Lateral orientation sub-routine 63 utilizes sling lateral displacement data 65 to determine the amount that sling shot 12 has been rotated (about a vertical axis passing though the center of the handle of sling shot 12 and between and parallel to the spaced apart "legs" of the slingshot 12) to the left or right and to generate signals to control 61 representing such orientation. Control 61 transmits control signals to display screen 64 to cause the orientation of sling shot 12 to be properly represented on display screen 64.

Projectile path sub-routine 51 utilizes the sling pull distance data 57 and the game unit orientation data 56 to calculate the path of the stone or other projectile that is launched by sling shot 12 after the sling is pulled and released when a user "drags" the sling in the direction of arrow A in the manner described above. When the sling is dragged in the direction of arrow A, it is presumed that the handle and legs of the sling shot are held and remain in fixed position (assuming that the orientation of unit 10 remains fixed and that the sling is not moved to the left or right or, as discussed below, "off center"). Sub-routine 51 takes into account the force of gravity in calculating a projectile path. Sub-routine 51 also includes a table of projective velocity values in relation to the distance that sling 27 is pulled from its normal at rest, unstretched position. Possible projectile paths 14 to 16 are illustrated in FIG. 1. The greater the sling pull distance, the longer the projectile path 14 to 16. Possible projectile paths 17 to 19 are illustrated in FIG. 2. Possible projectile paths 20 to 22 are illustrated in FIG. 3.

In one embodiment of the invention, a touch controlled button 29 is provided on display screen 64. When screen 64 is pressed above button 29, the projected projectile path 28 is illustrated and appears on display screen 64. If a projected projectile path 14 to 22 will intersect a target 25, control 61 can, if desired, cause a target symbol (not shown) to appear on the target 25. While a user is sliding his finger over screen 64 to stretch the sling, the projected corresponding projectile path changes on screen 64, i.e., the greater the distance that the sling is distended, the longer the projectile path. In another embodiment of the invention, the projectile path appears only after the movement of the user's finger over screen 64 while "stretching" the sling stops.

Controller 65 can also, if desired, be programmed such that if a stone or other projectile launched by slingshot 12 will hit the ground but is near a target, the control 61 will alter the projectile path and guide the stone to the target, especially if the target is at a greater distance. This programming enables a user to more easily hit targets.

Figure 6:
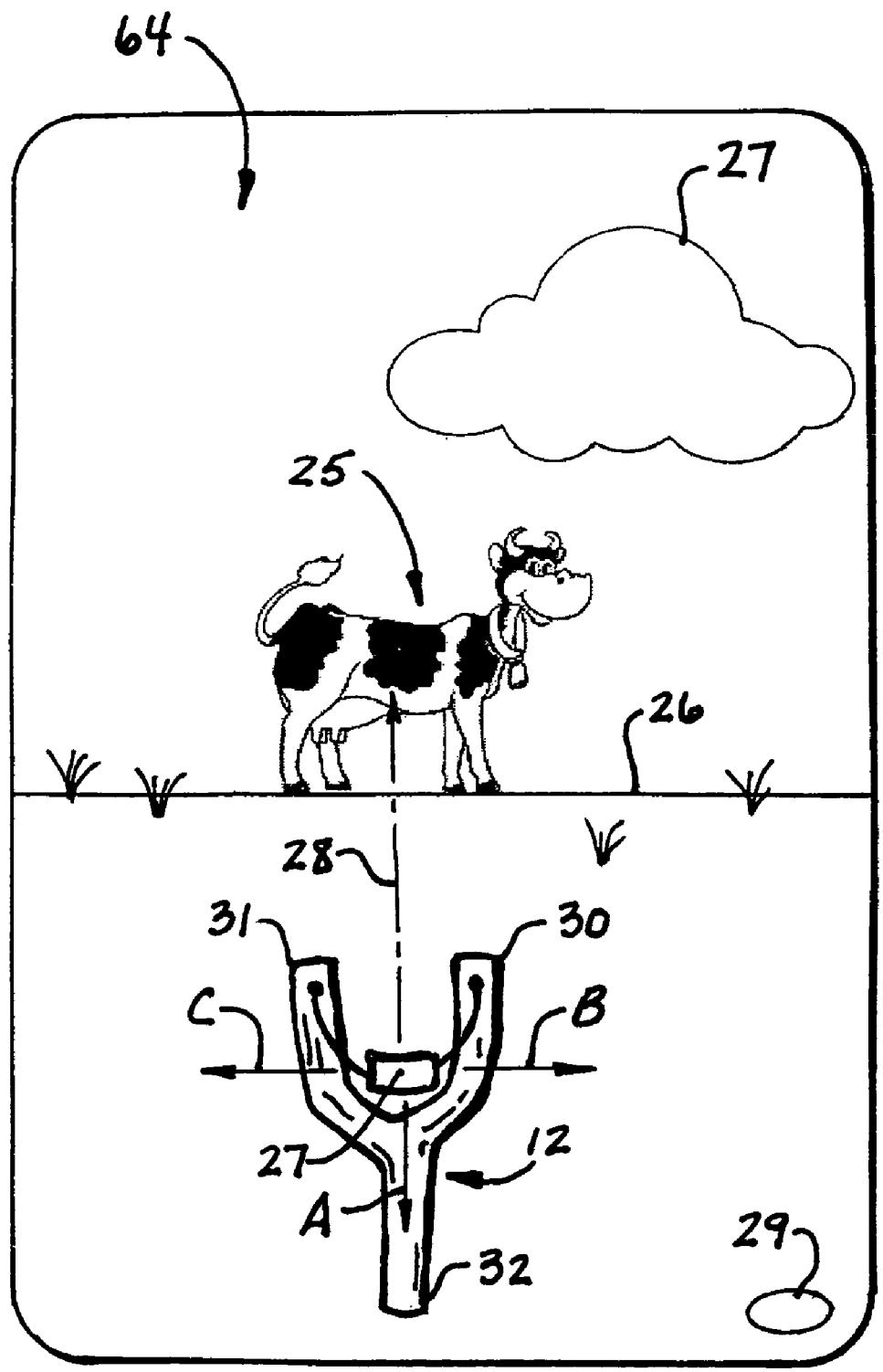

As is illustrated in FIG. 6, during the game the display screen shows a slingshot in the foreground, a horizon line 26 in the distance, and at least one potential target such as a cow 25. In most case multiple targets such as cows, trees, rocks, vehicles, etc. are positioned on the ground (or in the sky) at different distances away from the slingshot. As would be appreciated by those of skill in the art, a weapon other than a slingshot can be utilized. A target 25 can be positioned on the ground at a location that is on or off of the horizon line 26.

The horizon line 26 is the line of demarcation between the ground and the sky. On the display, the sky typically appears blue and has clouds 27. The targets can move or be stationary with respect to the slingshot 12. For example, if a target is a cow, the cow can be standing still, move to the left or right, or move toward or away from the slingshot 12. Game iterations of varying difficult can be provided. For example, an easier game iteration involves hitting stationary target. A more difficult game iteration involves hitting moving targets.

As earlier described herein, the user operates the sling 27 portion of the slingshot by touching the display screen with a finger to touch the middle, or "pouch" portion 27, of the sling, then dragging his or her finger over the screen toward the bottom (or possibly the side) of the screen to "pull" or "stretch" the sling back, and then lifting the finger off the screen to release a projectile (e.g. a stone) from the slingshot.

One objective of the game is for a user to keep the pouch portion 27 of the sling centered while the user drags a finger over screen 64 to distend the sling. If the pouch portion 27 remains centered, then when the sling is released (when the user lifts his finger off the screen) the pouch portion moves forward and passes between legs 30 and 31 (FIG. 6) at a point which is equidistant from each leg. In FIG. 6, pouch portion 27 remains centered if it is pulled directly back in the direction of arrow A. If the user, while sliding his finger over screen 64 to distend the sling, inadvertently moves his finger along a path that moves to the left or right of the path indicated by arrow A, this will cause the path of pouch portion 27 to be "off center" and, when pouch portion 27 passes between arms 30 and 31, to be closer to one arm 30, 31 than the other arm. As a result, the projectile will not travel along path 28 and will be off target. When slingshot 12 is in the orientation illustrated in FIG. 6, it is relatively easy, when a user is sliding his or her finger over screen 64 to distend the sling, to move pouch portion 27 along the proper path so that portion 27 remains centered. When, however, slingshot 12 is turned about a vertical axis that is perpendicular to the ground 13 and is aimed at targets on the left or right portion of screen 64, it is more difficult to stretch pouch portion 27 along a path that will cause portion 27 to pass between arms 30 and 31 at a point that is equidistant from each arm. In one easier embodiment of the game, the slingshot 12 does not rotate about an axis that is perpendicular to ground 13 but simply moves left or right on screen 64 in the direction of arrow C or arrow B, respectively while maintaining the orientation shown in FIG. 6. In the orientation of slingshot 12 illustrated in FIG. 6, the each arm 30, 31 lies in a common flat plane that is parallel to or coincident with the flat plane of screen 64.

The graphics associated with the program preferably actually show the sling being stretched and pulled back. When the individual removes his finger from the screen, the sling is released and the display screen shows the sling shooting a stone or other projectile at a target illustrated on the screen. The stone flies along a parabolic trajectory away from the slingshot towards the horizon.

The velocity of the projectile increases as the sling 27 is "pulled" further back by a user's dragging his or her finger a greater distance over the display screen. The greater the velocity the longer the trajectory and consequently the farther away the stone flies.

As is illustrated in FIGS. 1 to 3, tilting the game unit 10 up or down functions to tilt—on the display screen—the slingshot up or down relative to the ground to alter the angle at which a projectile moves along a parabolic trajectory upwardly away from or downwardly toward the ground when the sling is released. The angle of the trajectory affects its length and consequently how far away from the player the projectile will fly before falling to the ground. Consequently, when the hand held unit 10 is manually tilted up or down, the microprocessor in unit 10 causes the display on screen 64 to change appropriately, i.e., the horizon line moves up or down on the screen and there is a concomitant change up or down in the position of the targets 25, the slingshot 12, and other objects on the screen 64. This is similar to computer controlled simulated aerial combat games in which the horizon moves up or down or rotates on a computer screen when a joy stick is used to alter the orientation of a fighter plane and, therefore, to alter what the "pilot" (i.e., the player) sees on the screen as the plane turns, climbs, or dives.

When the game unit 10 is tilted up or down, such movement is detected by the accelerometer 62 or other orientation detection system which then transmits this information to the memory 66 so that the microprocessor controller 65 can adjust the display on the screen 64 to show the slingshot 12 being tilted up or down and to show the position of the horizon line 26 and other objects 25 changing.

In one embodiment of the game, when the user places his finger on the sling pouch portion 27 and drags his or her finger over the screen to the left (in the direction of arrow C) or right (in the direction of arrow B), the slingshot 12 rotates about a vertical axis that is perpendicular to the ground 13 and that passes through the center of elongate handle 32. This turns slingshot 12 on the display screen 64 to point toward a target on the left side or right side, respectively, of the screen. The touch screen distance (lateral) sensor 54 operatively associated with the screen 64 detects the movement of the user's finger over the screen to the left or right and transmits this information to the controller 65 so that control 61 can appropriately adjust the display screen to depict the rotation of the slingshot 12 to point to the right or left.

In another embodiment of the game, when the user places his finger on the sling pouch portion 27, drags his or her finger over the screen to the left (in the direction of arrow C) or right (in the direction of arrow B) and then releases the sling, the slingshot 12 doesn't turn on the screen 64 but the direction of where the projectile (e.g. a stone) will fly changes to the left or right respectively. The sensor 54 associated with the screen 64 detects the movement of the user's finger over the screen to the left or right and transmits this information to the controller 65 so that the control 61 can appropriately adjust the path of the trajectory and calculate the point where the projectile hits a target or hits the ground illustrated on screen 64. The ground 13 in FIGS. 1 to 3 represents the ground, or earth, on which a user stands and is different from the ground illustrated on display 64.

In another embodiment of the game, when the user rotates the game unit 10 to the left or right about an imaginary axis that is perpendicular to the ground 13, the slingshot 12 on the display screen 64 also moves to the left or right to point toward a target on the left side or right side, respectively, of the screen. The orientation detection system detects such left or right movement of the game unit and transmits this information to the controller 65 so that control 61 can appropriately alter the display screen.

One key novel feature of the game is that the orientation and operation of the slingshot 12 on the screen 64 is determined both by a user dragging his or her finger (or a pointer or other object) over or adjacent the screen and by a user tilting the game unit 10. In this respect, the object on the screen that is being controlled by the user's finger and by tilting the game unit need not be a slingshot, but could be a depiction of a car, a plane, a bow and arrow, a person running, a gun, etc. The fact that a user simultaneously employs the swiping motion of the finger and tilting the game unit 10 to control the orientation, movement, and/or operation of a slingshot 12 or other device that is depicted on the display screen 64 functions to improve the manual dexterity and hand—eye coordination of the user. Further, the user's hand is moved and used in one manner (for example to alter spatially the orientation of the game unit 10) while the user's finger is moved and used in a different manner (for example to touch the screen with a finger, drag the finger over the screen, and remove the finger from the screen). A user either can use one hand for both tilting the game unit 10 and swiping the finger for dragging the sling, or the user can use one hand for holding and tilting the game unit and another hand for swiping the finger to drag the sling pouch portion 27.

Spatial movement accomplished by dragging a finger over the screen can be characterized as movement in two dimensions or directions (defined using the x and y axes) over the surface of the screen.

Tilting the game unit 10 can be characterized as spatial movement in two dimensions if the game unit 10 is rotated about one axis or can be characterized as movement in three dimensions if the game unit 10, when tilted, is rotated about two or more axes. In FIG. 2, game unit 10 is rotated about one axis and the spatial movement occurs in two dimensions.

In one embodiment of the invention, the game is played on an iPhone. As would be appreciated by those of skill in the art, utilization of the invention is not limited to an iPhone.

The game keeps score by tracking the number of targets that are hit during an iteration of the game. The score can continuously or intermittently appear on screen 64

In another variation, the game can include a "landscape" mode whereby two slingshots 12 (or other projectile-launching devices) are displayed simultaneously. Each of the slingshots is played using a different one of the user's hands.

In a further variation, the projectiles fly through one or more different mediums that affect the way the projectiles travel. For example, an "underwater" version has stones fly very slowly and for short distances, while an "outer-space" version has an inverse effect.

Figure 5:
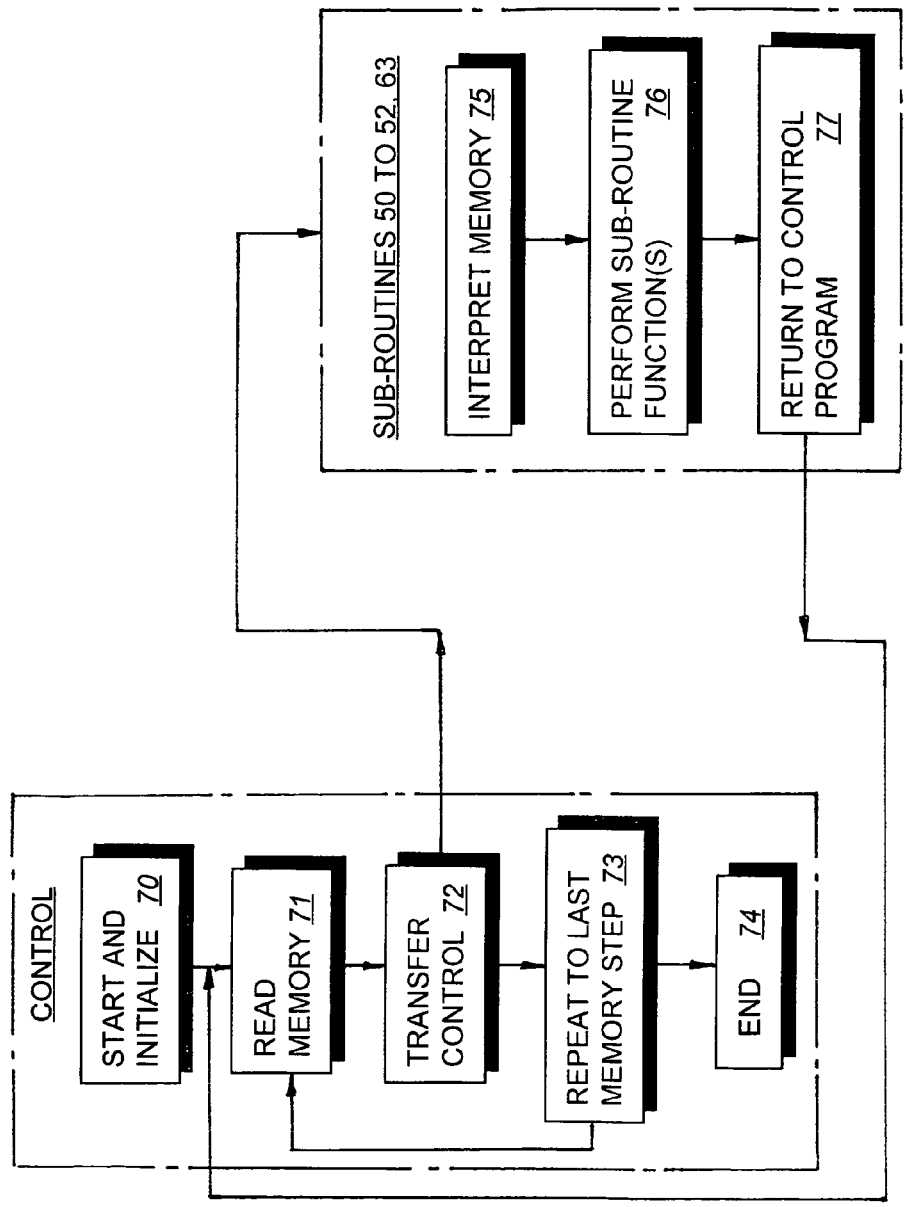
FIG. 5 is a block diagram illustrating a sample computer logic used in the operation of the game unit of FIG. 4; and, FIG. 6 is a front view of the display screen of the game unit of the invention illustrating the mode of operation thereof.

FIG. 5 is a block flow diagram which illustrates a possible program or logic function which is executed by the controller 65. The basic control program consists of commands to "start and initialize" 70, "read memory" 71, and "transfer control" 72 sequentially to one of subroutines 50 to 52, 63. Each sub-routine 50 to 52, 63 includes the steps of "interpret memory" 75, "perform the sub-routine function(s)" 76, followed by "return to control program" 77. The sub-routines are repeated as indicated by the "repeat to last memory step" 73, followed by an "end" 74 program step which completes the execution of the program.

Having described our invention in such terms as to enable those of skill in the art to understand and practice the invention, and having described the presently preferred embodiments thereof, We Claim:

1. A handheld device, comprising
   (a) a display screen;
   (b) a touch sensitive system configured to detect and generate first signals representing a finger
      (i) touching the display screen,
      (ii) moving across the display screen, and
      (iii) lifting off the display screen;
   (c) an orientation detection system configured to detect and generate second signals representing a spatial orientation and movement of the hand held device;
   (d) a microprocessor configured to:
      display at least one target on the display screen;
      display a sling shot on the display screen, the sling shot including a frame, an extendable sling, and a projectile releasable from the sling;
      receive the second signals and adjust the orientation of the sling shot on the display screen when the spatial orientation of the handheld device is adjusted;
      receive the first signals and distend the sling when a finger is placed on the display screen over the sling and is slid over the display screen, and release the sling and propel the projectile from the sling toward the target when the finger is lifted from the display screen, wherein the sling is displayed distended by an amount based on an amount the finger is slid over the display screen and the projectile is displayed moving a distance across the display screen based on the amount the finger is slid over the display screen;

detect a direction the finger is slid over the display screen and display the sling distended from the frame at an angle based on the direction of the finger is slid over the display screen;

determine a path for the projectile based on the amount the finger is slid over the display screen and based on a direction the finger is slid over the display screen; and display a line showing the path for the projectile.

2. The handheld device of claim 1 wherein the microprocessor is further configured to display the line prior to the finger releasing the sling.

3. The handheld device of claim 1 wherein the microprocessor is further configured to simulate a force of gravity on the projectile after being released from the sling.

4. The handheld device of claim 1 wherein the microprocessor is further configured to move a location of the sling shot on the display screen in response to the movement of the hand held device.

5. The handheld device of claim 1 wherein the microprocessor is further configured to change an orientation of the sling shot displayed on the display screen in response to the spatial orientation of the hand held device.

6. The handheld device of claim 1 wherein the microprocessor is further configured to increase a distance the projectile is projected across the display screen in response to an increase in the amount the finger is slid over the display screen.

7. The handheld device of claim 1 wherein the microprocessor is further configured to determine the path for the projectile based on the spatial orientation of the hand held device, the amount the sling is distended, and the direction the sling is distended back from the frame.

8. The handheld device of claim 1 wherein the microprocessor is further configured to detect a direction the finger is slid over the display screen and display the sling distended from the frame at an angle based on the direction the finger is slid over the display screen.

9. A method, comprising:

displaying, with a computing device, a sling shot on a display screen, wherein the sling shot comprises a frame and a sling retaining a projectile;

detecting, with the computing device, a selector selecting a location on the sling shot associated with stretching the sling;

detecting, with the computing device, a movement of the selector while the selector maintains selection of the location on the sling shot;

detecting, with the computing device, an amount of the movement of the selector;

detecting a direction of the movement of the selector;

displaying, with the computing device, the sling in a stretched position based on the detected amount of movement of the selector and the detected direction of movement of the selector;

displaying, with the computing device, the sling released from the stretched position and projection of the projectile in response to the selector deselecting the location on the sling shot;

calculating a path of the projectile based on the amount of the movement of the selector and the direction of the movement of the selector;

displaying, with the computing device, the projectile traveling a distance from the sling shot based on the amount of movement of the selector; and displaying a line showing the path on the display screen.

10. The method of claim 9, further comprising simulating a force of gravity on the projectile in the projection of the projectile.

11. The method of claim 9 further comprising:

detecting an orientation of the computing device; and changing the projection of the projectile based on the orientation of the computing device.

12. The method of claim 11 further comprising changing an orientation of the sling shot in response to the orientation of the computing device.

13. The method of claim 9 further comprising:

displaying a target in front of the sling shot; and displaying the projectile hitting the target in response to the path of the projectile intersecting the target.

14. The method of claim 9 wherein the selector comprises a finger and detecting the selector comprises detecting the finger pressing against the display screen.

15. An apparatus, comprising:

a memory configured to store an image of a projection device;

logic circuitry configured to:

display the image of the projection device;

detect a selector selecting a location associated with the image of the projection device;

detect a distance of movement of the selector while selecting the location associated with the image of the projection device;

detect a direction of movement of the selector while selecting the location associated with the image of the projection device;

calculate a trajectory path for an object based on the distance of movement of the selector and the direction of movement of the selector;

display the image of the projection device projecting the object along the trajectory path in response to the selector deselecting the location associated with the image of the projection device; and display an illustration of the trajectory path for the object.

16. The apparatus of claim 15, further comprising:

a sensor configured to detect a change in an orientation of a mobile device; and calculate the trajectory path for the object based on the change in the orientation of the mobile device.

17. The apparatus of claim 15 wherein the image of the projection device comprises a sling shot and the logic circuitry is configured to display a projection of the object from the sling shot along the trajectory path.

* * * * *